United States Patent [19]
Nogi et al.

[11] Patent Number: 5,894,832
[45] Date of Patent: Apr. 20, 1999

[54] COLD START ENGINE CONTROL APPARATUS AND METHOD

[75] Inventors: Toshiharu Nogi, Hitach-naka, Japan; Frank W. Hunt, White Lake, Mich.

[73] Assignee: Hitachi America, Ltd., Research and Development Division, Tarrytown, N.Y.

[21] Appl. No.: 08/931,172

[22] Filed: Sep. 16, 1997

Related U.S. Application Data

[63] Continuation of application No. 08/679,273, Jul. 12, 1996, abandoned.

[51] Int. Cl.$^6$ .................... F02M 51/00; F02D 41/06
[52] U.S. Cl. .................. 123/491; 123/179.15; 123/549
[58] Field of Search .................. 123/491, 179.3, 123/179.15, 306, 337, 179.21, 549, 545

[56] References Cited

U.S. PATENT DOCUMENTS

| | | | |
|---|---|---|---|
| 4,587,941 | 5/1986 | Mishina et al. | 123/550 |
| 4,627,405 | 12/1986 | Imhof et al. | 123/549 |
| 5,224,456 | 7/1993 | Hosoda et al. | 123/520 |
| 5,315,975 | 5/1994 | Hattori et al. | 123/337 |
| 5,322,043 | 6/1994 | Shriner et al. | 123/306 |
| 5,394,857 | 3/1995 | Yamakawa | 13/686 |
| 5,465,701 | 11/1995 | Hunt | 123/531 |
| 5,482,023 | 1/1996 | Hunt et al. | 123/491 |
| 5,529,035 | 6/1996 | Hunt et al. | 123/179.15 |

OTHER PUBLICATIONS

SAE 880558, Nogi et al.; Mixture Formation of Fuel Injection Systems in Gasoline Engines; Feb. 29–Mar. 4, 1988.

*Primary Examiner*—Willis R. Wolfe
*Assistant Examiner*—Hieu T. Vo
*Attorney, Agent, or Firm*—Gifford, Krass, Groh, Sprinkle, Anderson & Citkowski, P.C.

[57] ABSTRACT

An apparatus for reducing noxious gases in the exhaust emissions of an automobile is disclosed. During engine cold start, a cold start injector having a heater downstream of the injector outlet vaporizes fuel so that a leaner air-fuel mixture can be used, thereby reducing engine emissions before the engine and catalytic converter warm up. The heater includes various configurations for swirling the fuel and exposing it to large surface areas for improving the vaporization of the fuel. A tapered bore surrounding the throttle allows for precise air flow control into the cold start device during engine warm-up.

36 Claims, 14 Drawing Sheets

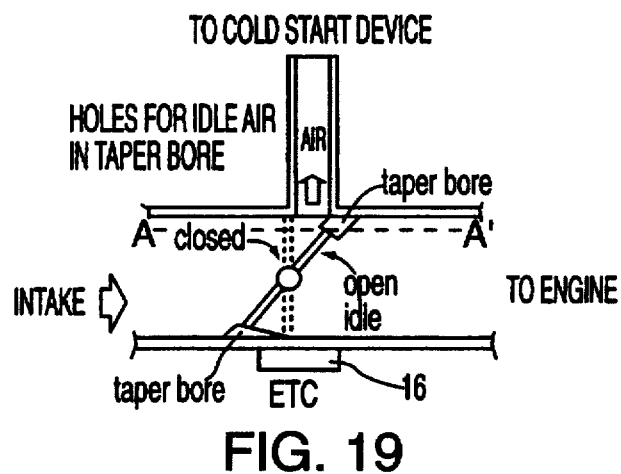
FIG. 19
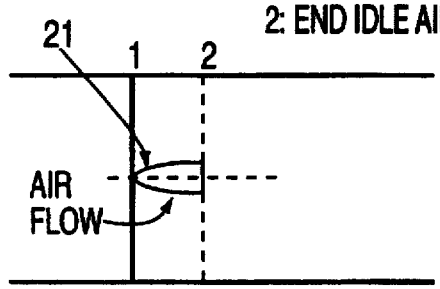
FIG. 20  1: START IDLE AIR FLOW
2: END IDLE AIR FLOW
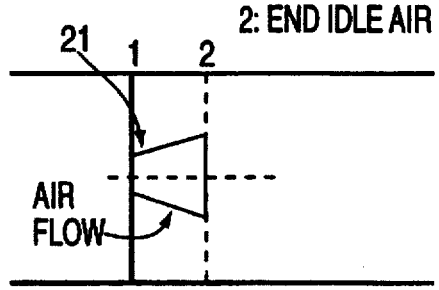
FIG. 21  1: START IDLE AIR FLOW
2: END IDLE AIR FLOW
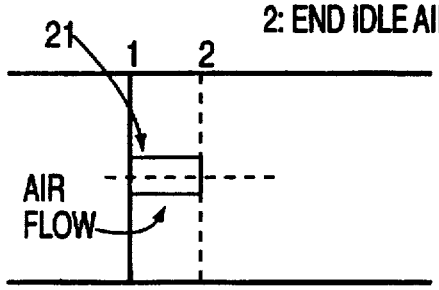
FIG. 22  1: START IDLE AIR FLOW
2: END IDLE AIR FLOW
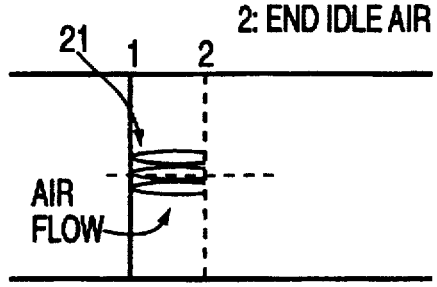
FIG. 23  1: START IDLE AIR FLOW
2: END IDLE AIR FLOW

COLD START ENGINE CONTROL APPARATUS AND METHOD

This application is a continuation of patent application Ser. No. 08/679,273 filed on Jul. 12, 1996 now abandoned.

FIELD OF THE INVENTION

The present invention relates generally to cold start devices used with internal combustion engines, and in particular to an apparatus and method for vaporizing the fuel ejected from a cold start injector by delivering the fuel through a heated chamber prior to the intake valve of a cylinder head.

BACKGROUND OF THE INVENTION

The increase in atmospheric pollution generated by exhaust emissions from conventional gasoline and diesel powered internal combustion engines have caused both federal and state governments to enact laws and establish regulations which impose even greater restrictions on the performance of motor vehicles in the areas of exhaust gas emission and fuel economy. For example, the ULEV FTP 75 standards for gasoline engines that are to take effect in the next few years call for double digit reductions in the levels of noxious emissions over the 1990 ULEV FTP standards (up to 90% in the case of hydrocarbons).

During the start of a cold engine, and before the catalyic converter can warm up to be effective, engine emissions are particularly high. After warm-up and during normal running, the catalytic converter reduces emissions, and the internal combustion engine usually operates at a 14.7:1 air to fuel mixture ratio which also yields reduced emissions. However, when the engine temperature is below a certain point, it is more difficult for all of the fuel to be vaporized, and a choke factor is needed to supply extra fuel. Otherwise, not enough fuel will be vaporized, resulting in a mixture leaner than the desired 14.7:1 stoichiometric ratio. Typically, the first twenty seconds of engine startup operates in a cold start "enrichment" mode in which a richer than stoichiometric air/fuel mixture is delivered. As the engine heats up to normal operation, the additional fuel supplied in the air/fuel mixture is gradually decreased until the desired stoichiometric ratio is reached and the engine is running smoothly.

During the cold start enrichment mode, the increased amount of fuel delivered to the combustion chamber causes an increase in hydrocarbon and nitrous oxide emissions due to incomplete burning of the fuel. At the present levels of allowable hydrocarbon emission, the cold start enrichment mode uses an air/fuel ratio of about 10:1 through 14:1, producing emissions that do not exceed today's standards of 7.0, 0.39 and 0.40 grams/mile for CO, HC/NMOG and NOx. These levels of emissions, however, will have to be reduced to 1.7, 0.040 and 0.20 grams/mile respectively to meet the U.S. government's ULEV FTP 75 emissions regulations in the near future. This represents a 90% reduction in HC emissions over present levels.

Heretofore, manufacturers have provided a number of devices to warm the engine faster and to make the choke more sensitive. However, these devices have been too slow or too complicated to effectively meet upcoming ULEV FTP 75 regulations during that short cold start duration period. Furthermore, catalytic converters provide almost no assistance to reducing emission levels during the cold start period. Thus, what is needed is an uncomplicated apparatus for enabling smooth engine operation during cold starts that produces engine emissions that will meet the U.S. government's future ULEV FTP 75 regulations requirements.

Accordingly, it is an object of the present invention to provide a cold start apparatus which can reduce the amount of excess fuel needed during cold start procedures.

It is also an object of the present invention to provide a cold start apparatus which can reduce the exhaust emissions of an internal combustion engine during cold start operation so as to meet the requirements under the upcoming ULEV FTP 75 regulations governing exhaust emissions.

It is a further object of the present invention to reduce the overall fuel consumption of an internal combustion engine.

It is another objective of the present invention to provide a cold start apparatus that includes self cleaning mode which reduces maintenance requirements.

It is still another object of the present invention to accomplish the above-stated objects by utilizing an apparatus which is simple in design and use, and economical to manufacture.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, but as embodied herein or as modified in view of any variations which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, an apparatus for vaporizing fuel before it is supplied to a cylinder of a multi-cylinder internal combustion engine is disclosed. The multi-cylinder engine includes a fuel supply, and an air intake passageway having a throttle valve having a pivotally secured throttle plate disposed therein. The cold start apparatus includes (i) a housing fluidly coupled on one end to the air intake passageway downstream of the location of the throttle; (ii) a cold start fuel injector having an outlet and disposed in the housing; (iii) an idle air conduit fluidly coupled on one end to the air intake passageway, and fluidly coupled on the other end to the housing for delivering air adjacent to the outlet of the cold start fuel injector for intermixing air with fuel ejected from the cold start fuel injector; and (iv) a heated chamber having a longitudinal lumen and disposed at the outlet of the cold start fuel injector for vaporizing the air-fuel mixture before it is delivered to the engine cylinder. The heating chamber includes a plurality of independent heating element sections that can be separately controlled to vary the temperature across the heating chamber.

A method is also disclosed for reducing automobile exhaust emissions during the cold start of a multi-cylinder internal combustion engine having a fuel supply, a plurality of fuel injectors located adjacent to separate engine cylinders, a cold start fuel injector and heater fluidly coupled to the engine cylinders, and an air passageway having a pivotally secured throttle valve disposed therein. The method includes the steps of (i) initiating power to the heater for a period of time before the engine is started; (ii) supplying the fuel to the engine cylinders through the cold start injector; (iii) mixing the fuel from the cold start injector with air at an amount sufficient to produce a substantially stoichiometric ratio of the air to fuel; (iv) passing the substantially stoichiometric air-fuel mixture over the heater element to cause the fuel to be vaporized; (v) supplying the vaporized air-fuel mixture to the engine cylinders when the engine is started, and until the engine reaches a temperature of about 60° C.; and (vi) switching from fuel supplied by the cold start injector to fuel supplied by the plurality of fuel injectors after the engine reaches a pre-established threshold as measured by temperature, time or a combination of both.

BRIEF DESCRIPTION OF THE DRAWINGS

FIG. 19 is a perspective diagram of a cross-sectional view of a preferred embodiment of a modified throttle valve according to the present invention.

FIGS. 20–23 are cross-sectional views of various embodiments of an air aperture taken along line A–A' in FIG. 19, according to the present invention.

DETAILED DESCRIPTION OF THE PREFERRED EMBODIMENTS OF THE INVENTION

The present invention contemplates an improved cold start apparatus and method having a heated chamber of various configurations to provide for an increased vaporization of fuel and a heater burn thereof to reduce noxious exhaust emissions and decrease fuel consumption during engine cold starts.

Figure 1:
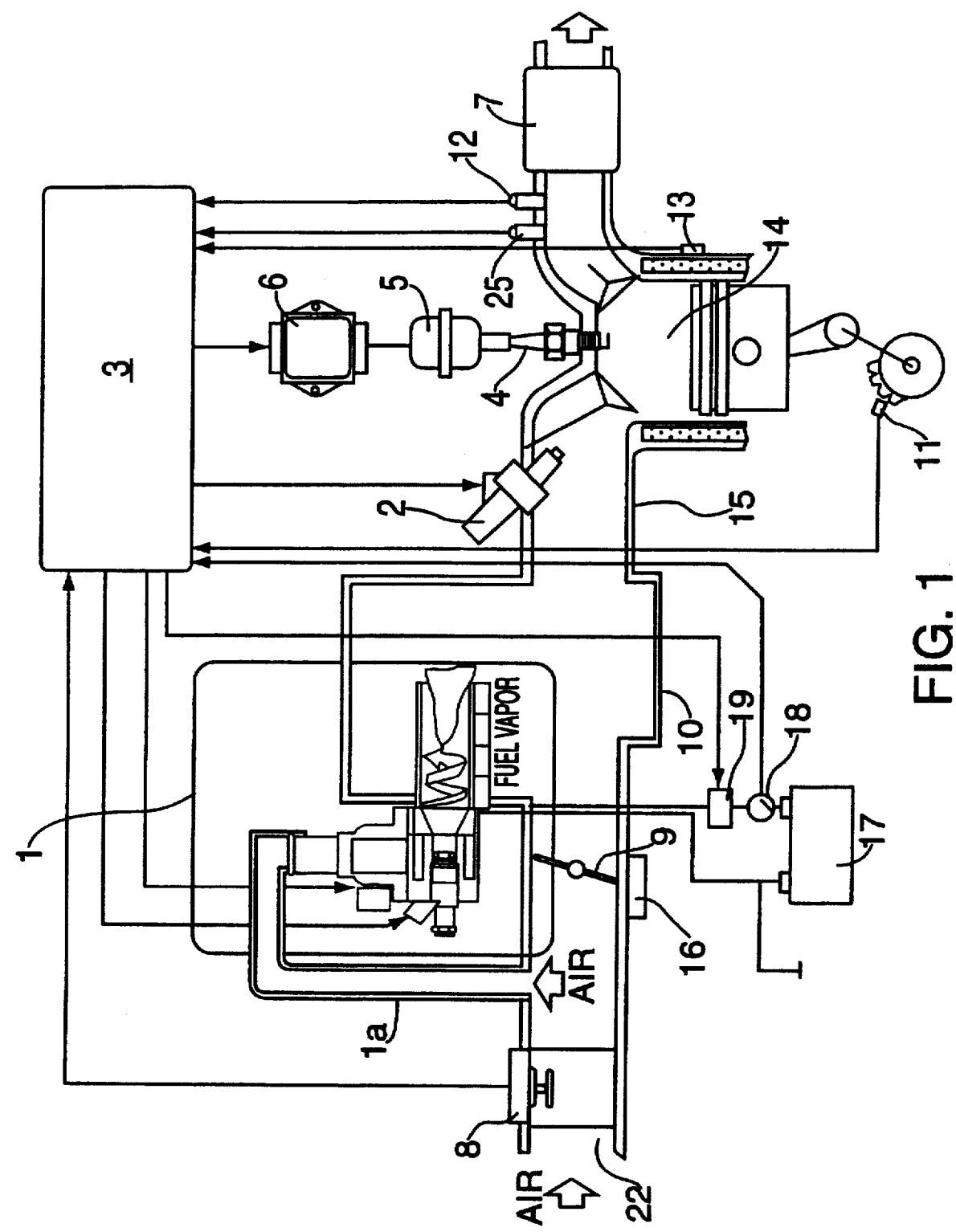
FIG. 1 is a perspective diagram illustrating a preferred embodiment of the cold start device of the present invention mounted on an internal combustion engine.

Referring now to the drawings, wherein like numerals refer to like elements, there is disclosed in FIG. 1 broad aspects of a preferred embodiment of the invention. It is to be understood that the following description of an internal combustion engine, related to but not forming part of the invention, is provided for illustrative purposes only. In FIG. 1, an internal combustion engine fuel control system having a cold start apparatus or device (also referred to as a "CSD") identified generally by reference numeral 1 in accordance with the present invention is shown. The internal combustion engine is only shown partially because the internal details of the engine, except for its cold start apparatus 1 and related controls, do not form part of the invention. However, a portion of the internal combustion engine is depicted for ease in understanding how the present invention may be practiced in conjunction with any known types of internal combustion engines. It should be further noted that the cold start apparatus 1 is not limited to use in reciprocating engines of the type depicted but may also be employed with rotary type engines. Additionally, the invention is described in conjunction with only a single cylinder of a multi-cylinder engine, as it is believed that those skilled in the art can readily understand how the invention is practiced in conjunction with multiple cylinder engines and engines of varying configurations.

In one preferred embodiment of the invention, the cold start apparatus 1 is mounted on the intake manifold 10 of an internal combustion engine. The cold start apparatus 1 may be mounted directly to the intake manifold 10 for compact design. Alternatively, the outlet of the cold start apparatus 1 can be connected to the intake manifold 10 via a conduit or hose, in a stand alone design.

As seen in FIG. 1, the intake manifold 10 is coupled on one end to an air supply, preferably through an air cleaner (not shown for clarity), which supplies a stream of air as indicated by the arrow on the left side of FIG. 1. Disposed in the air passageway 22 of the intake manifold 10 is a mass air flow sensor 8 of the type known by those skilled in the art. Downstream of the mass air flow sensor 8 is a throttle valve 9 having a pivotally secured throttle plate (referred to in combination as a "throttle") whose rotational position is monitored by throttle position sensor 16. Coupled to the air passageway 22 between the mass air flow sensor 8 and the throttle 9 is a conduit 1-a referred to as an idle air inlet for delivering incoming air to the cold start apparatus 1 (described in detail below). After passing through the throttle 9 into the intake manifold 10, the air is mixed with fuel supplied by the cold start apparatus 1 (under cold start conditions), or with fuel supplied by a multi-port fuel injector 2.

Upon combustion, exhaust gases exit the combustion chamber 14 passed a lambda ($O_2$) exhaust sensor 12 employed for detecting the oxygen level in the exhaust gases, and through a catalytic converter 7 used for reducing noxious emissions, as is practiced in the art. In addition, a temperature sensor 25 is mounted in the path of the exhaust gasses upstream of the catalytic converter 7 to monitor the temperature of the exhaust gases as they exit the combustion chamber 14.

An engine control unit 3 ("ECU") monitors engine conditions through signal connections to various sensors, such as the mass air flow sensor 8, the throttle position sensor 16, a crank angle sensor 11, the $O_2$ sensor 12, the exhaust temperature sensor 25, a coolant temperature sensor 13 mounted in the engine jacket, and a current meter 18 connected to the car battery 17. As can be appreciated by those skilled in the art, a voltage meter or the like may be substituted for the preferred current meter 18, without departing from the scope of the invention.

The ECU 3 contemplated by the present invention may be implemented programmatically or by direct electrical connection through customized integrated circuits, or a combination of both, using any of the methods known in the industry for providing the functions described herein without departing from the teachings of the invention. Those skilled in the art will appreciate that from the disclosure of the invention provided herein, commercial semiconductor integrated circuit technology would suggest numerous alternatives for actual implementation of the functions of the ECU 3 that would still be within the scope of the invention.

The ECU 3 uses sensor inputs as feedback for controlling engine operation functions. For example, the ECU 3 operates the firing of spark plug 4 through an ignition module 6, while controlling the flow of fuel to the intake manifold 10 by pulsing the cold start apparatus 1 and/or fuel injector 2. The ECU 3 also controls the operation of a heater switch 19 for delivering current from the battery 17 to the heater component (described below) of the cold start apparatus 1. The heater switch 19 may be any mechanically operated switch, such as a relay or solenoid activated switch, or the heater switch 19 may be of a solid state design. In a preferred embodiment of the present invention, the heater switch 19 is a solid state device that can operate with about 300 amps peak and about 80–100 amps steady state.

Figure 2:
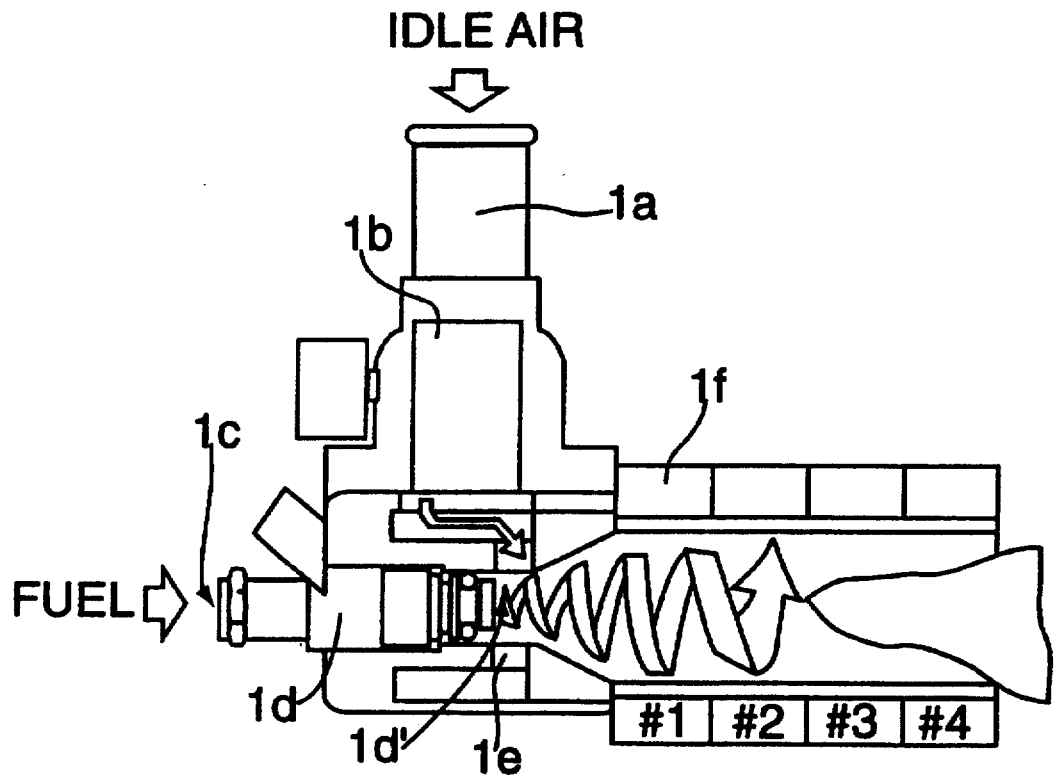
FIG. 2 is a perspective diagram of a cross-sectional view of a preferred embodiment of the cold start device of the present invention.
Figure 3:
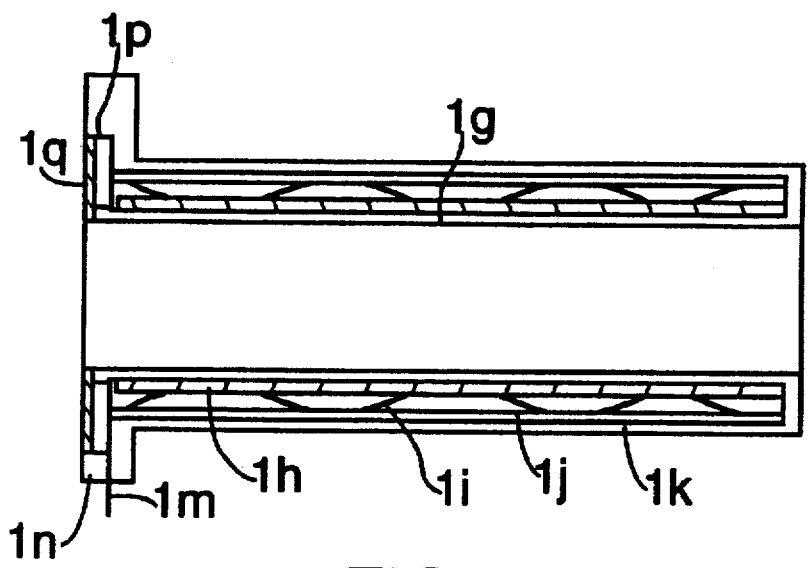
FIG. 3 is a perspective diagram of a cross-sectional view of one embodiment of a fuel heater according to the present invention.

The components of the cold start apparatus 1 are best understood by referring to the operative arrangement of the invention illustrated in detail in FIGS. 2 and 3. As illustrated in FIGS. 2 and 3, one preferred embodiment of the cold start apparatus 1 includes a housing containing a fuel injector 1-$d$ having an inlet or orifice 1-$c$ for receiving fuel therein. Idle air is delivered through the idle air inlet 1-$a$ under the control of an idle speed control valve 1-$b$, and down to an idle air mixer 1-$e$ for mixture with fuel being ejected from an outlet or orifice 1-$d'$ of the CSD fuel injector 1-$d$. Idle air mixing with the fuel spray assists the atomization of the fuel particles thereby promoting the vaporization of the fuel.

Upon mixing, the air-fuel mixture traverses through (or across) a heater element 1-$f$ which fully vaporizes the fuel. The heater element 1-$f$ is preferably a cylindrical canister defining a longitudinal chamber or lumen therein through which the air-fuel mixture is vaporized. It should be noted that although a cylindrical shape is preferred for reasons that include ease of manufacture, uniformity of fuel discharge and uncomplicated hose connectivity, the present invention is not so limited in that any shape would be acceptable as long as the foregoing functions can be achieved.

The heater element 1-$f$ may, optionally, be comprised of a plurality of separate heater sections or elements disposed adjacent to each other (designated by the numerals #1, #2, #3 and #4 in FIG. 2). In a preferred embodiment, each separate section is electrically isolated from the other, so that the current to each section can be independently controlled. In this manner, the temperature of each section can be independently set so that, for example, the temperature of section 2 can be hotter than the temperature of section 1 and so on to have a gradually increasing temperature exposure for the passing air-fuel mixture. Alternatively, independent sections can be turned on while others remain off, or turned on or off at different instances of time. Varying the start of the separate heater sections will reduce the current spike when the heater element 1-$f$ is initially powered. In addition, some heater sections can remain off before engine start, to conserve energy when the battery's 17 voltage is deemed inadequate for powering all of the heater elements and then cranking the engine. Lastly, it is anticipated that it will be expensive to manufacture the heater element 1-$f$ when it made in sections.

The heater element 1 and the housing of the cold start apparatus 1 is preferably made of aluminum or a high temperature plastic, such as teflon, nylon or the like. As shown in FIG. 3, the heater element 1-$f$ preferably includes an inner surface 1-$g$ of the lumen that is made of a heat conductive material such as aluminum or the like to facilitate a rapid warm-up. The aluminum surface 1-$g$ also provides a durable surface that resists fuel deposits and pressure fluctuations during backfiring. However, as can be understood by those skilled in the art, the inner surface 1-$g$ of the heater element 1-$f$ may be made from a number of suitable elements or alloys that can provide for heat transfer to the passing fuel for vaporization thereof.

Working outward from the inner surface 1-$g$, FIG. 3 discloses a heated surface 1-$h$ biased against the inner surface 1-$g$ by a spring 1-$i$. The biasing effect of the spring 1-$i$ allows for the thermal expansion and contraction of the heated surface 1-$h$ while maintaining its contact with the inner surface 1-$g$. The heated surface 1-$h$ is electrically coupled to the ECU 3 (shown in FIG. 1) by positive electrode 1-$m$ and negative electrode 1-$n$. One electrodes (either 1-$m$ or 1-$n$) is connected to the heated surface 1-$h$ through spring 1-$i$, while the other electrode contacts the inner surface 1-$g$. As can be appreciated by those skilled in the art, positive electrode 1-$m$ and negative electrode 1-$n$ are isolated electrically from the body of heater element 1-$f$ by positive electrode insulator 1-$q$ and negative electrode insulator 1-$p$, respectively. Continuing through the layers of the heater element 1-$f$, FIG. 3 shows insulator 1-$j$ covering heated surface 1-$h$ and spring 1-$i$. The insulator layer 1-$j$, is, in turn, covered by outer surface 1-$k$.

Figure 4:
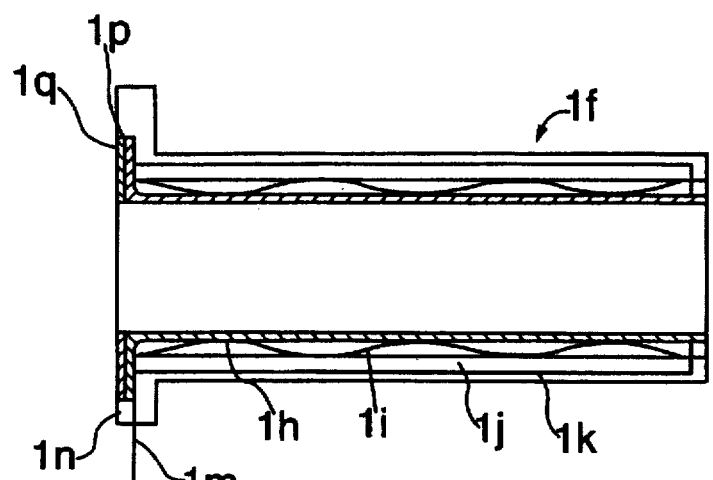
FIG. 4 is a perspective diagram of a cross-sectional view of another embodiment of a fuel heater according to the present invention.

FIG. 4 discloses another embodiment of the heater element 1-$f$ without an aluminum inner layer 1-$g$. This embodiment is similar to the embodiment of FIG. 3, but with the heated surface 1-$h$ directly exposed to the passing air-fuel mixture. Advantageously, warm-up time and heat loss are reduced in this embodiment. However, over time and without proper maintenance, heater performance may be degraded due to fuel contaminants impinging upon the heated surface 1-$h$.

Figure 5:
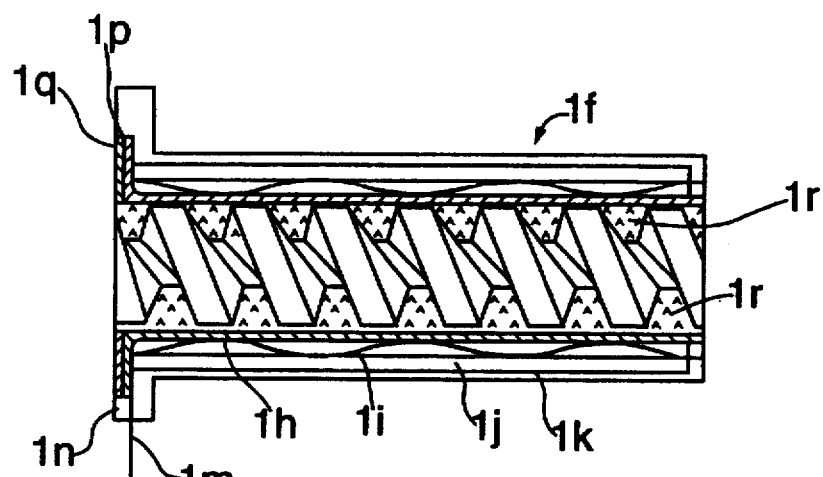
FIG. 5 is a perspective diagram of a cross-sectional view of yet another embodiment of a fuel heater according to the present invention.
Figure 6:
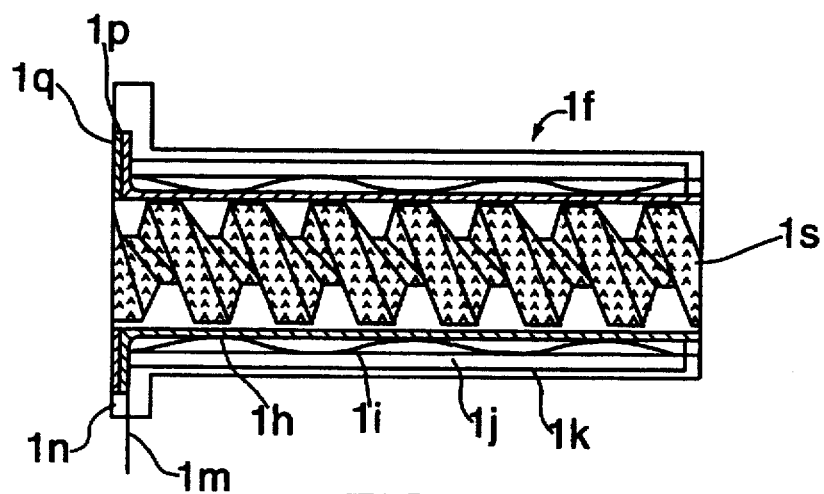
FIG. 6 is a perspective diagram of a cross-sectional view of still another embodiment of a fuel heater according to the present invention.

FIGS. 5 and 6 disclose two additional embodiments of the heater element 1-$f$ as shown in FIG. 4.

In FIG. 5, the disclosed embodiment of heater element 1-$f$ includes a lumen having an internal thread-like configuration in which the heating surface 1-$h$ contains a spiraling depression, or alternatively, spiraling projections 1-$r$ inside the lumen. The increased surface area of the heating surface 1-$h$ and the circuitous configuration causes the air-fuel mixture to travel down the lumen in a swirling fashion with increased exposure to the greater heating area. As a result, the atomization and vaporization of the fuel is both faster and more homogeneous. This allows for the design of heating element 1-$f$ of less length while still achieving the desired performance, and an overall reduction in the heat loss to the air.

In the embodiment disclosed in FIG. 6, the heating surface 1-h is configured generally in the shape of a corkscrew 1-s through the length of the lumen. As can be understood by those skilled in the art, this embodiment causes the air-fuel mixture to also flow in a swirling fashion and provides an increase in the surface area of the heating surface 1-h over the embodiments disclosed above. Consequently, the vaporization effect is increased, and a shorter heating element 1-f design can be used to produce the same results. Due to the similarity of the embodiments illustrated in FIGS. 4-6 with that of FIG. 3, further description of these embodiments should not be necessary to understand the construction or operation of the different embodiments of heating element 1-f.

To implement a preferred embodiment of the cold start apparatus 1 in a conventional internal combustion engine, some additional components may be necessary. The salient components, along with their inter-relationship, are shown in block diagram form in FIG. 7.

Figure 7:
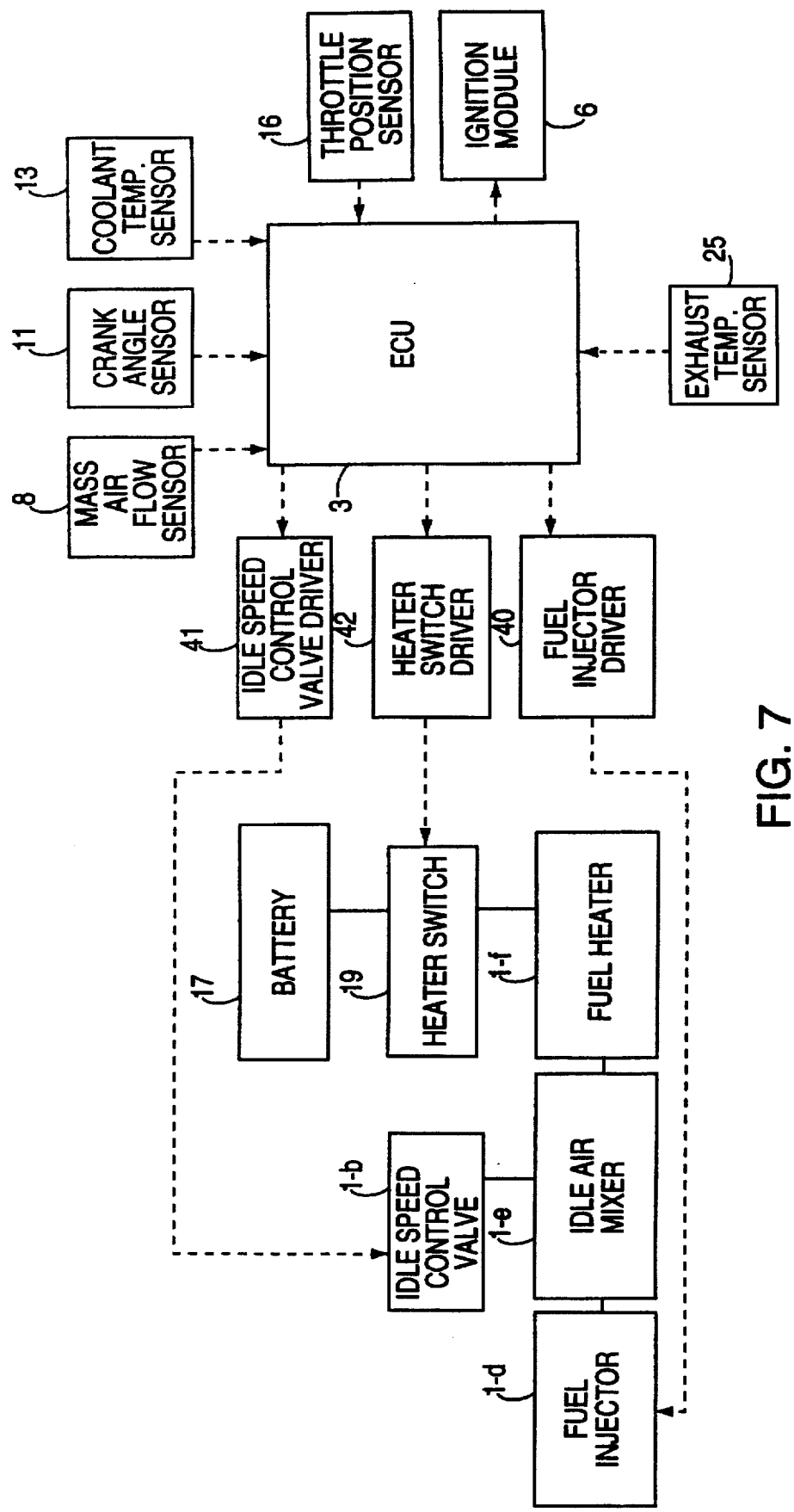
FIG. 7 is a block form diagram of the control systems of a cold start device, according to the present invention.

The right hand side of FIG. 7 shows the ECU 3, which receives sensor input data from the mass air flow sensor 8, the crank angle sensor 11, coolant temperature sensor 13 and throttle position sensor 16. Relying primarily on these sensor inputs, the ECU 3 controls the operation of the components of the cold start apparatus 1. The ECU 3 controls the conduction of electricity between the fuel heater 1-f and the battery 17 by opening and closing the heater switch 19 though a heater switch driver 42 coupled to or integrated within the ECU 3. The ECU 3 is also coupled to an idle speed control valve driver 41 for operating the idle speed control valve 1-b which regulates air flow to idle air mixer 1-e. As noted earlier, air at the idle air mixer 1-e mixes with the fuel ejected by CSD fuel injector 1-d to thereby assist in atomizing the fuel as it is delivered to the element heater 1-f. The pulsing of CSD fuel injector 1-d is controlled by a fuel injector driver 40 coupled between the CSD fuel injector 1-d and the ECU 3. As with the case of the heater switch driver 42, the idle speed control valve driver 41 and/or the fuel injector driver 40 may be a separate unit coupled to the ECU 3 or they may be a function integrated within the ECU 3 using commercially available electronic components.

Figure 8:
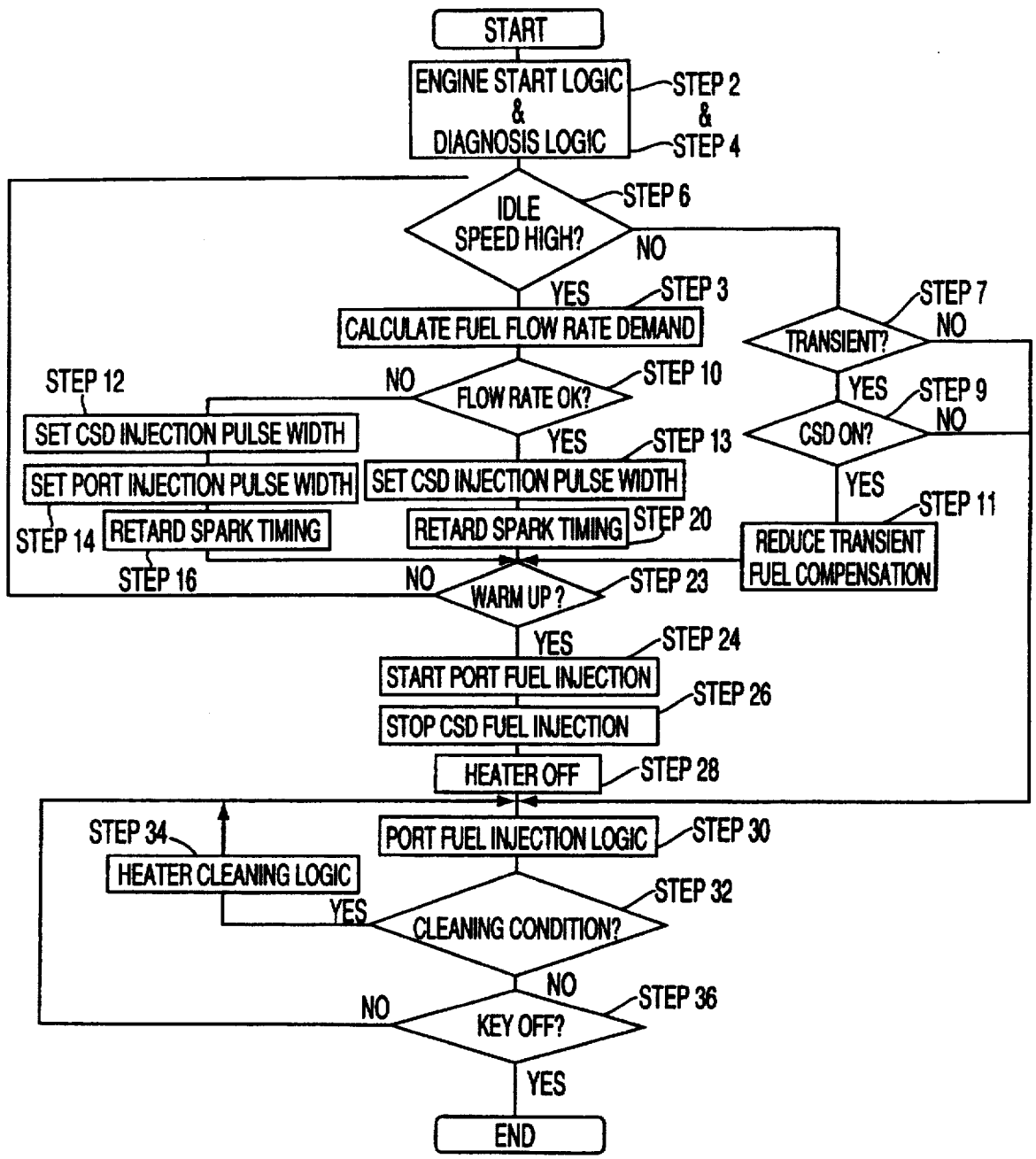
FIG. 8 is a flow diagram of the overall operation of a preferred embodiment of the cold start device of the present invention.
Figure 9:
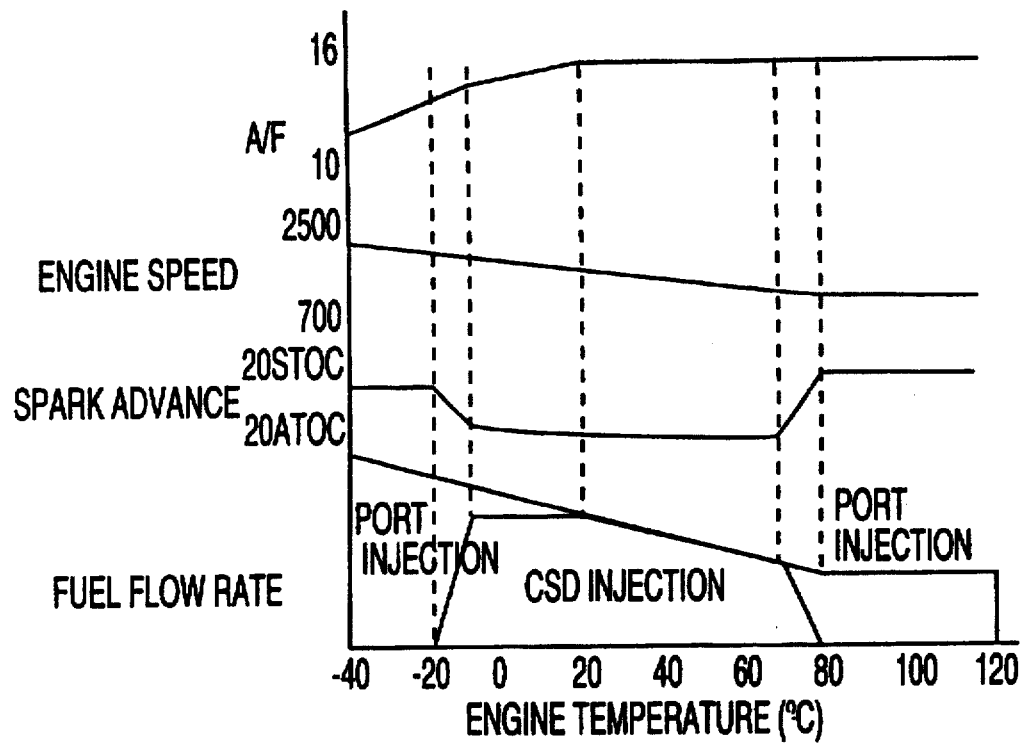
FIGS. 9 and 10 are graphical form diagrams representative of the operation of the cold start device over varying temperatures.
Figure 10:
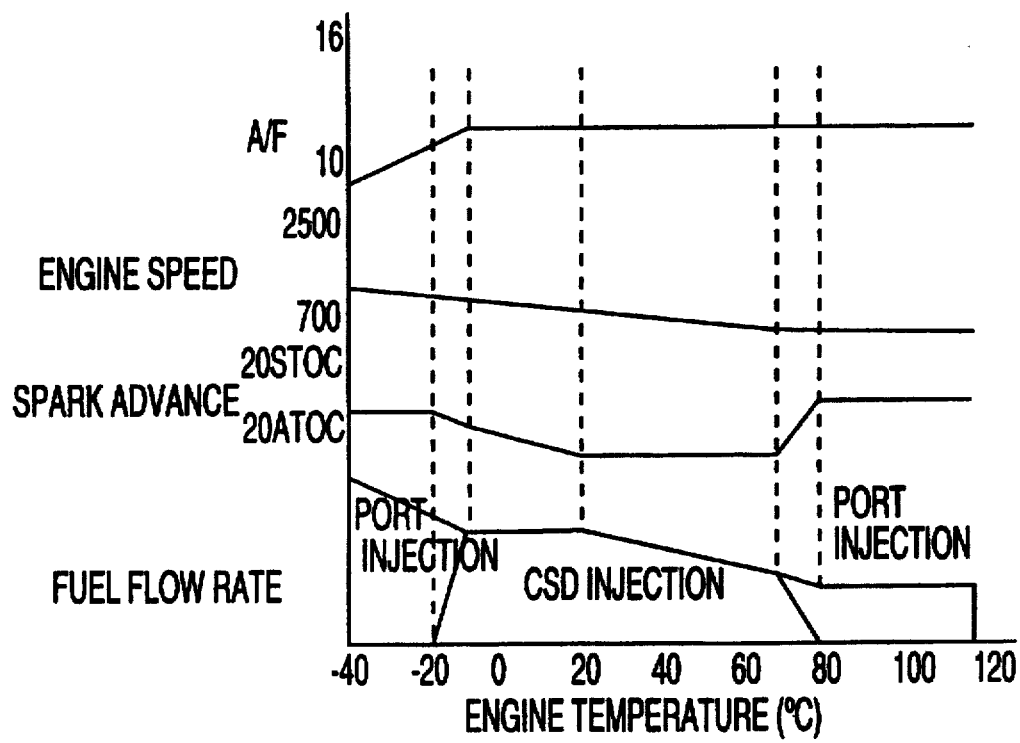

The overall operation of the cold start apparatus 1 during an engine cold start is illustrated in FIGS. 8-10. FIG. 8 is a flow chart of the overall operation of the cold start apparatus 1. FIGS. 9 and 10 show graphical representations of the cold start apparatus 1 with respect to the operation of port fuel injectors 2.

Reference will now be made to FIGS. 8 and 9 in combination. During a typical engine start up, the ECU 3 will cycle through engine start up procedures (step 2) and diagnostic procedures (step 4). These routines will be explained in detail below, however, for the purposes of explaining FIG. 8, it is assumed that both procedures have been completed successfully. In step 6, the ECU 3 first checks the idle speed to see if it is high, as determined by comparison to a preset threshold. If the idle speed is high, as when a cold engine is first started, then the ECU 3 will calculate the fuel flow rate demand of the engine (step 8).

If the fuel flow rate is lower than a preset threshold limit (step 10), such as when the engine temperature is below 20° C., the ECU 3 will set the injection pulse width of the cold start apparatus 1 and/or the fuel injector 2 (steps 12 and 14) depending on the engine temperature, as shown in FIG. 9. It should be noted that the engine temperature may be monitored either by coolant temperature sensor 13, exhaust temperature sensor 25, or a combination of both. The timing of the spark ignition is retarded several degrees (step 16) in accordance with such engine operating factors as the pulse width durations set in steps 12 and 14 above, the engine load, etc.

Alternatively, in step 10, if the fuel flow rate demand is within an acceptable range, only the injector pulse width of the cold start apparatus 1 is set (step 18), and the spark ignition timing is retarded a corresponding degree (step 20). The engine temperature is then checked (step 22). For engine temperatures above 0° C., only the CSD injector 1-d of the cold start apparatus 1 will be operating until engine warm-up is reached, and the functions utilizing port injectors 2 shown in branch through steps 12-16 will now be utilized. Until the engine temperature reaches warm-up (at about 80° C.), the process repeats steps 6 through 22.

In the preferred embodiment, when the engine temperature reaches 80° C., engine warm-up will have been reached, and port fuel injectors 2 take over (step 24) with the CSD fuel injector 1-d and heater 1-f being shut off (steps 26 and 28). Port fuel injector logic takes over from this point on to operate the port fuel injectors 2 (step 30). Although the preferred embodiment provides for switching fuel delivery from the CSD fuel injector 1-d to the port fuel injectors 2 upon engine temperature reaching the warm-up threshold, it should be noted that the switch between the fuel injectors could be triggered after a predetermined time period, or a combination of temperature and time measurements.

Returning briefly to step 6, if the idle speed setting did not exceed the preset threshold, the ECU 3 checks to see if the engine temperature is in one of the transient temperature ranges (step 7). As shown in FIG. 9, this range is from −20° C. to 20° C., and again in 60° C. through 80° C. In the embodiment represented in FIG. 10, the transient temperature ranges are from −20° C. to 0° and from 60° C. to 80° C. These transient ranges are characterized by a substantially "seesaw" operation of the port fuel injectors 2 with regard to the CSD injector 1-d, in which both types of injectors are supplying fuel to the engine in inversely varying amounts as the temperature changes.

Figure 11:
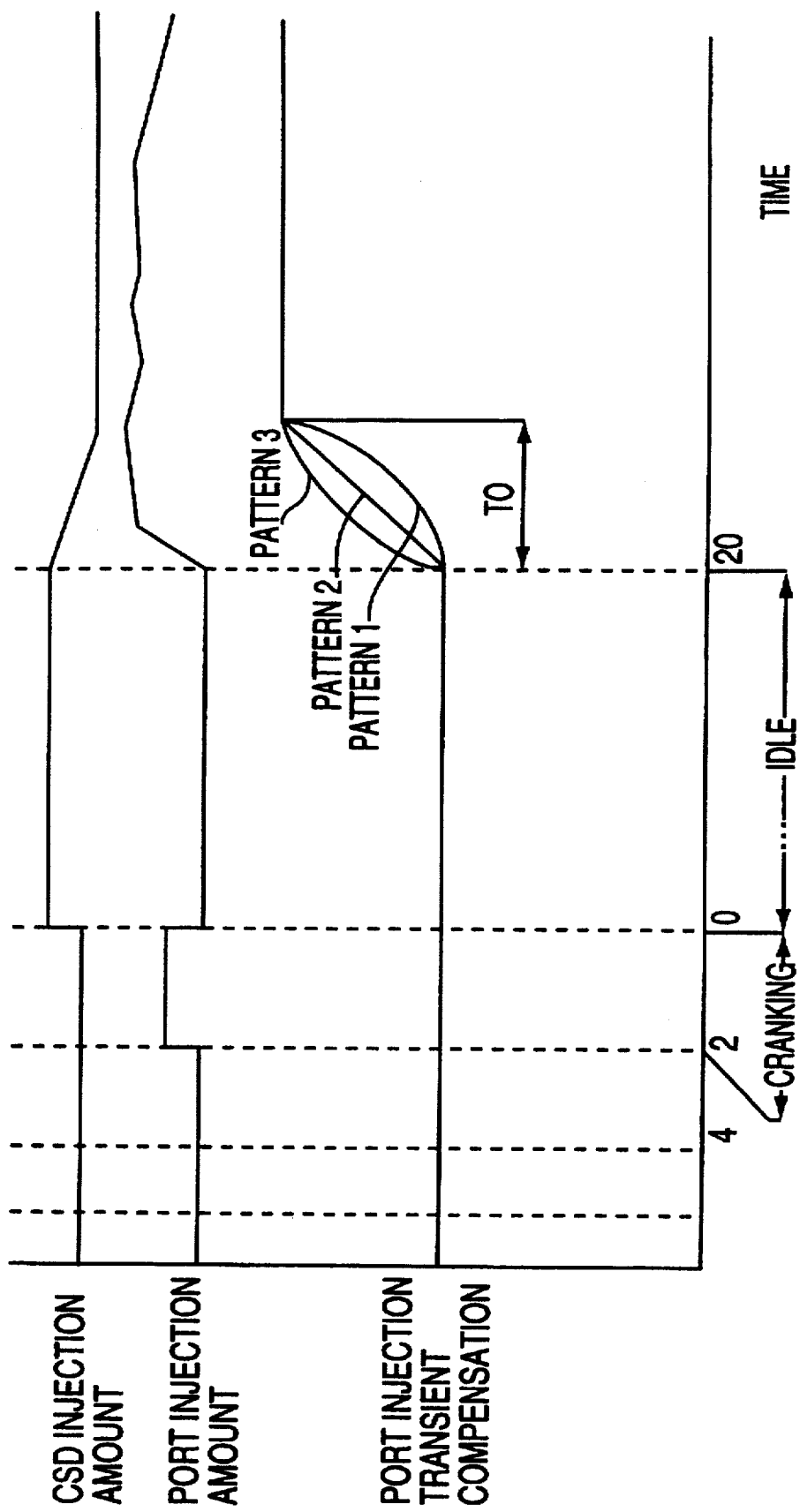
FIG. 11 is a graphical form diagram showing the operation of the cold start device over time.

Thus, as seen in step 7 of FIG. 8, if the engine temperature is not within a transient range with the engine idle speed low, then the engine temperature must be greater than 80° C., and only the port injectors 2 will be operational. Conversely, if the ECU 3 is operating within a transient range with low engine idle speed, the engine must be operating between 60° C. and 80° C., with CSD injector 1-d of the cold start apparatus 1 still supplying fuel (step 9). As the temperature increases, the fuel from injector 1-d is gradually reduced and the fuel supplied by the port injectors 2 is gradually increased until the 80° C. warm-up temperature is reached. As shown in FIG. 11, the fuel level supplied by the port fuel injector 2, as the cold start apparatus 1 decreases its fuel supply, does not necessarily have to be a linear inverse thereof (e.g., Pattern 2). Rather, a non-linear increase in the fuel supply might be followed, such as the non-linear increases depicted by Pattern 1 or Pattern 3. These fuel demand patterns may be used to account for varying factors such as intake manifold volume, engine displacement, engine rpm and load, and less than ideal fuel combustion.

Continuing with step 32 of FIG. 8, in the port fuel injection phase, the ECU 3 conducts a maintenance procedure for the cold start apparatus 1. Periodically, a cleaning condition is checked (step 32) for initiating a heater cleaning routine (step 34), as more fully explained below. This cycle of steps proceeds as long as the engine is running (step 36: ignition key in the "on" position).

Figure 12:
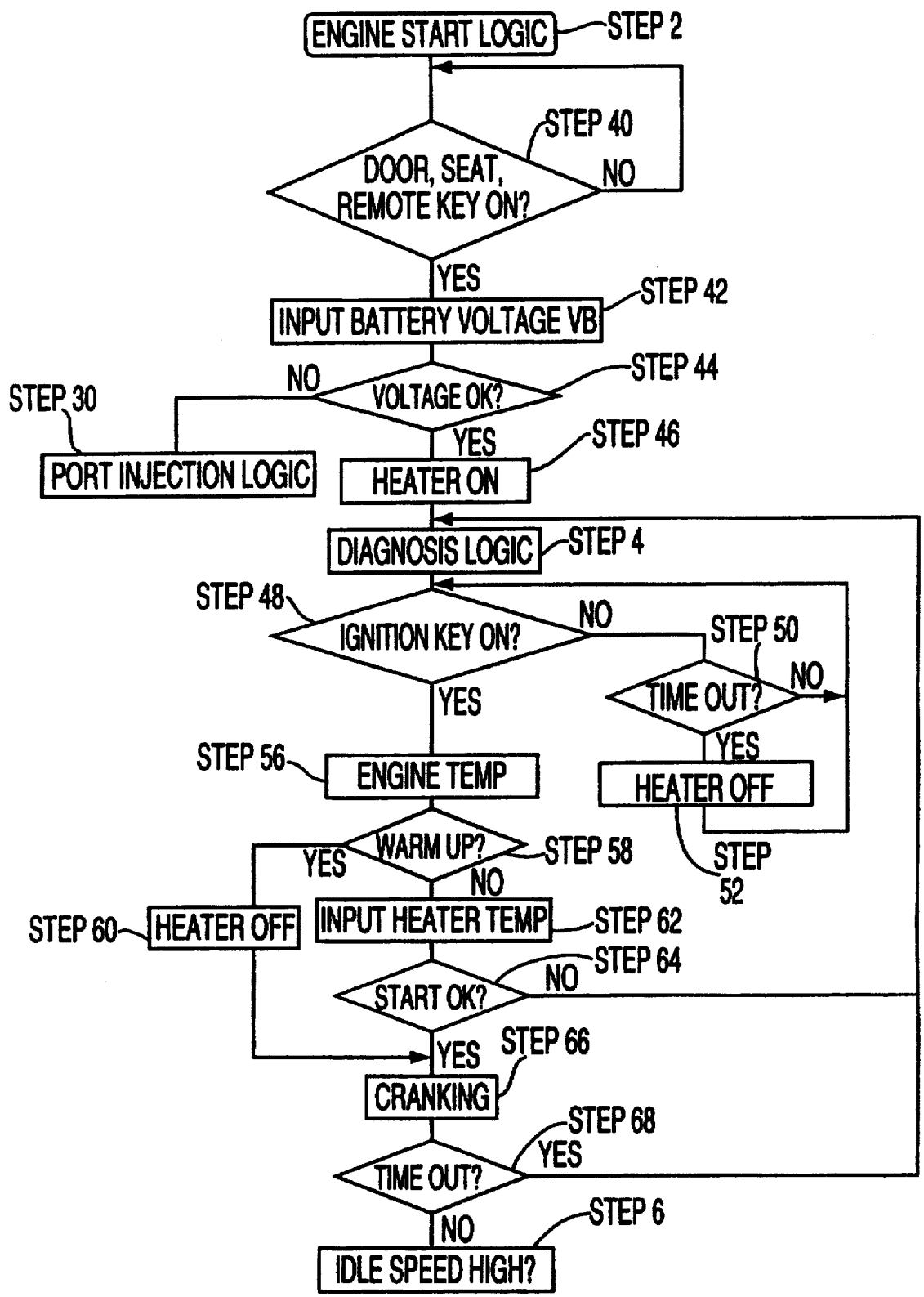
FIG. 12 is a flow diagram of the initial operation of the cold start device, according to the present invention.

Turning now to FIG. 12, the engine start logic procedure (shown as step 2 in FIG. 8) is described in detail. In a preferred embodiment of the invention, power to the heater element 1-f is initiated as quickly as possible to provide adequate warm-up time. As such, the heater element 1-f may be turned on upon the occurrence of a door switch being engaged, a remote key usage, a switch for detecting when a person sits in the driver's seat, or any combination of the foregoing (step 40). It is important to note that the action which is used to initiate power to the heater element 1-f is not critical to the invention, and that even using the car's ignition key switch as the trigger for heater element 1-f may suffice, as long as the heater element 1-f is engaged as soon as possible prior to engine start.

Once the process is started, the voltage of the car battery 17 is checked via current meter 18 to ensure that an adequate charge is available (step 42) to heat the heater element 1-f and crank the engine. If not enough voltage is present, as determined by pre-established criteria (step 44), then the ECU 3 proceeds directly to the port injection procedure outlined in step 30 of FIG. 8, and use of the cold start apparatus 1 is avoided altogether. This way, whatever charge is remaining in the car battery 17, it can be devoted to turning the start motor (not shown), another source of high current demand before the engine is running.

If enough voltage exists for both the needs of the heater element 1-f and the starter motor, the heater switch 19 is closed and the heater element 1-f is started (step 46). Next, the ECU 3 proceeds through a diagnosis logic routine (as seen in FIG. 4 of FIG. 8), which will be described in detail below. After diagnostics are successfully run, the ECU 3 checks to see how much time has lapsed since the heater element 1-f was turned on (step 48). If a predetermined time period has lapsed without the engine being started (step 50), then the heater element 1-f is turned off. Presumably, the vehicle's operator has entered the car, but does not intend to start the engine. This being the case, the heater element 1-f is no longer needed, and the current drain it produces is stopped (step 52).

With the ignition engaged, the engine temperature is measured (step 56). If the engine is already warmed-up (above 80° C.), then the heater element 1-f is turned off (steps 58–60) and the engine can be cranked (step 66). As can be appreciated, if the engine is cooled (below 80° C.), the temperature of the heater element 1-f is checked to see if it has heated up before proceeding with the engine start (steps 62–64). If the temperature of heater element 1-f has not risen, the process loops back through the diagnosis logic (step 4) until it is okay to start the ignition (step 64).

After checking the temperature of heater element 1-f (step 64) and finding it to be operating properly, the engine is cranked (step 66). A timer is started (step 68) and if engine cranking does not lead to engine start before a preset time-out occurs, engine diagnostics are run (step 4). As will usually be the case, the cranking will lead to engine start. The process then resumes to checking the idle speed (as in step 6 of FIG. 8).

Figure 13:
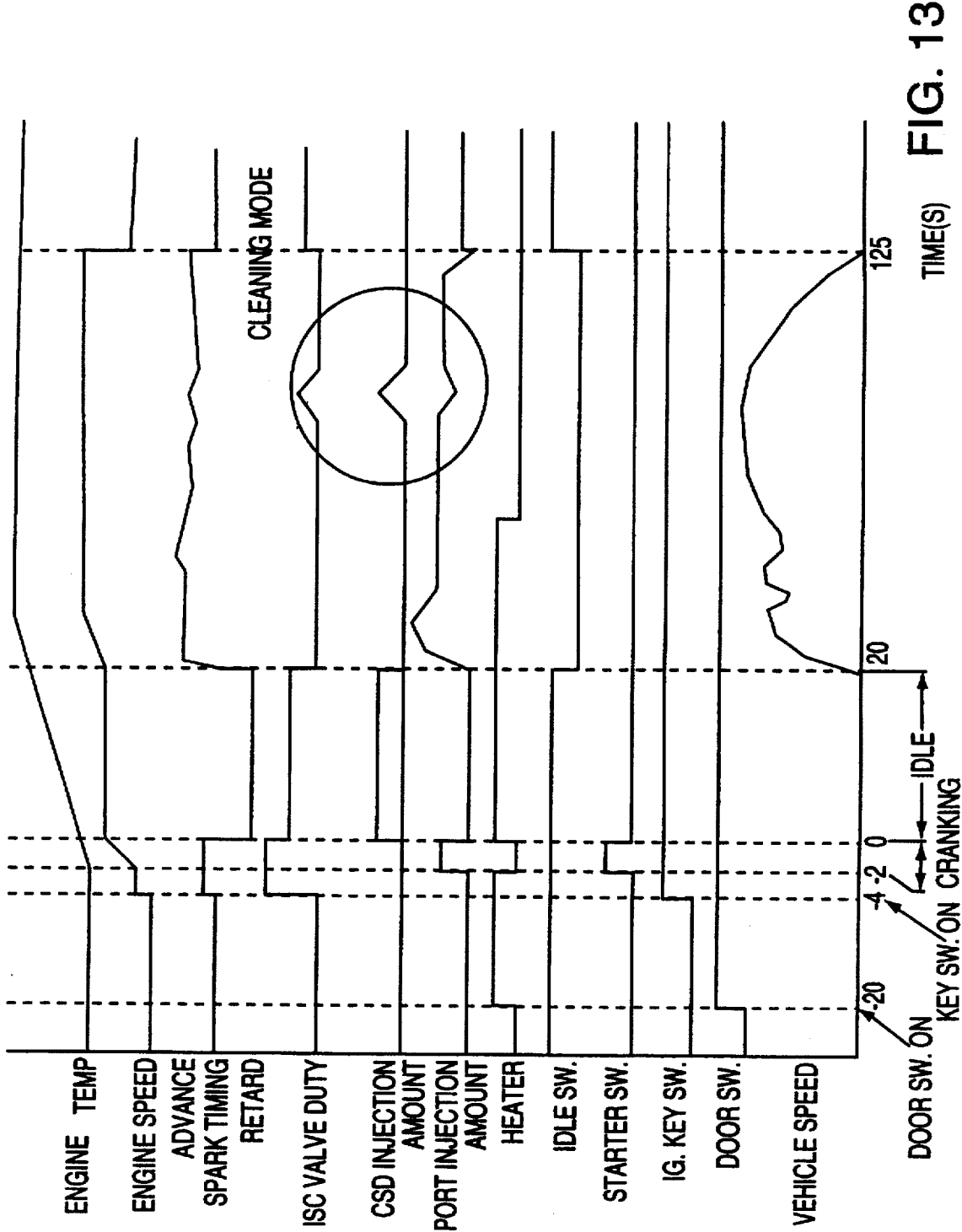
FIG. 13 is a graphical form diagram showing the operation of the cold start device and salient engine operations over time.

The timing diagram in FIG. 13 corresponds directly to the events outlined in the flow chart of FIG. 12. In the case of one preferred embodiment of the invention, once the door switch is activated (as by a person entering the vehicle), the heater element 1-f is switched on. The heater element 1-f is turned on before even the cold start apparatus 1 to reduce the possibility of unvaporized fuel being emitted. Next, when the ignition key is turned, the idle speed control valve 1-b is opened while the spark timing is advanced slightly. This is done so that during cranking, a small amount of fuel can be fired from the port fuel injector 2 to reduce the possibility of backfiring. During engine start, current to the heater element 1-f is halted so that all of the battery's 17 current can be directed to cranking the engine.

Once the engine starts, port fuel injection is stopped and fuel delivery from the CSD injector 1-d started. The spark timing is retarded. The amount of air through the idle speed control valve 1-b is lowered slightly, with enough air entering the cold start apparatus 1 to assist in the vaporization of fuel sprayed from CSD injector 1-d. These conditions typically continue for about 20 seconds, until the catalytic converter 7 reaches an anticipated warm-up state that begins reducing exhaust emissions.

After engine warm-up, the CSD injector 1-d is stopped, spark timing is set to normal and port fuel injector 2 takes over the function of supplying fuel to the engine. The heater element 1-f remains on a little longer to insure that no liquid fuel form the cold start apparatus 1 remains in the intake manifold.

Periodically, the ECU 3 will engage in a cleaning operation, as indicated in steps 32–34 in FIG. 8. Maintenance on the heater element 1-f consists of cleaning off deposits on the inner surface by spraying liquid fuel across it for a short duration. This can be seen in the encircled area of FIG. 13, when the CSD injector 1-d is momentarily turned on while the pulses width of the port injector 2 is simultaneously reduced for an equal duration. The idle speed control valve 1-b is also opened for this period, so that the passing air can carry the fuel across the heater element 1-f and into the engine cylinder 14. After the liquid fuel washes the inner surface of the heater element 1-f, it gets vaporized by the hot engine components within the intake manifold.

Figure 14:
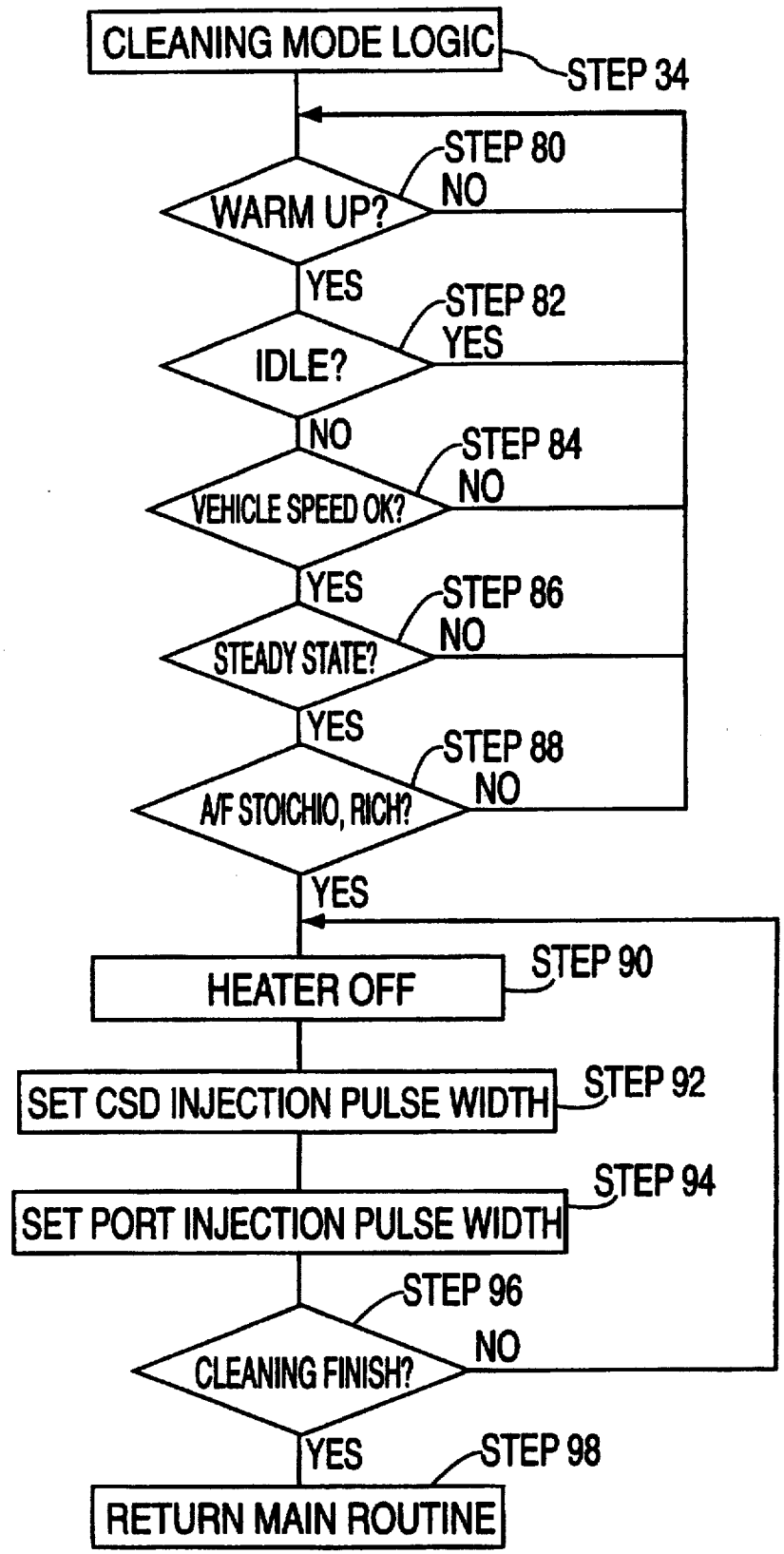
FIG. 14 is a flow diagram of the maintenance operation of the cold start device, according to the present invention.

The control characteristics of the cleaning operation are shown in the flow chart diagram of FIG. 14. Starting at the top, the cleaning mode procedure initiates (step 34, from FIG. 8) by first checking the engine coolant temperature to insure that the engine has warmed up (step 80). In addition, the ECU 3 checks to see that the engine is not idling, the vehicle speed and engine conditions are in a steady state, the air-fuel mixture ratio is not in a lean state and the heater element 1-f is off (steps 82–90). If all of these conditions are met, the CSD injector 1-d fires a preset pulse width of fuel (step 92) while the port injector 2 pulse width is reduced by a corresponding amount (step 94). When the cleaning operation is complete (step 96), the ECU 3 returns to normal engine operation routines.

Figure 15:
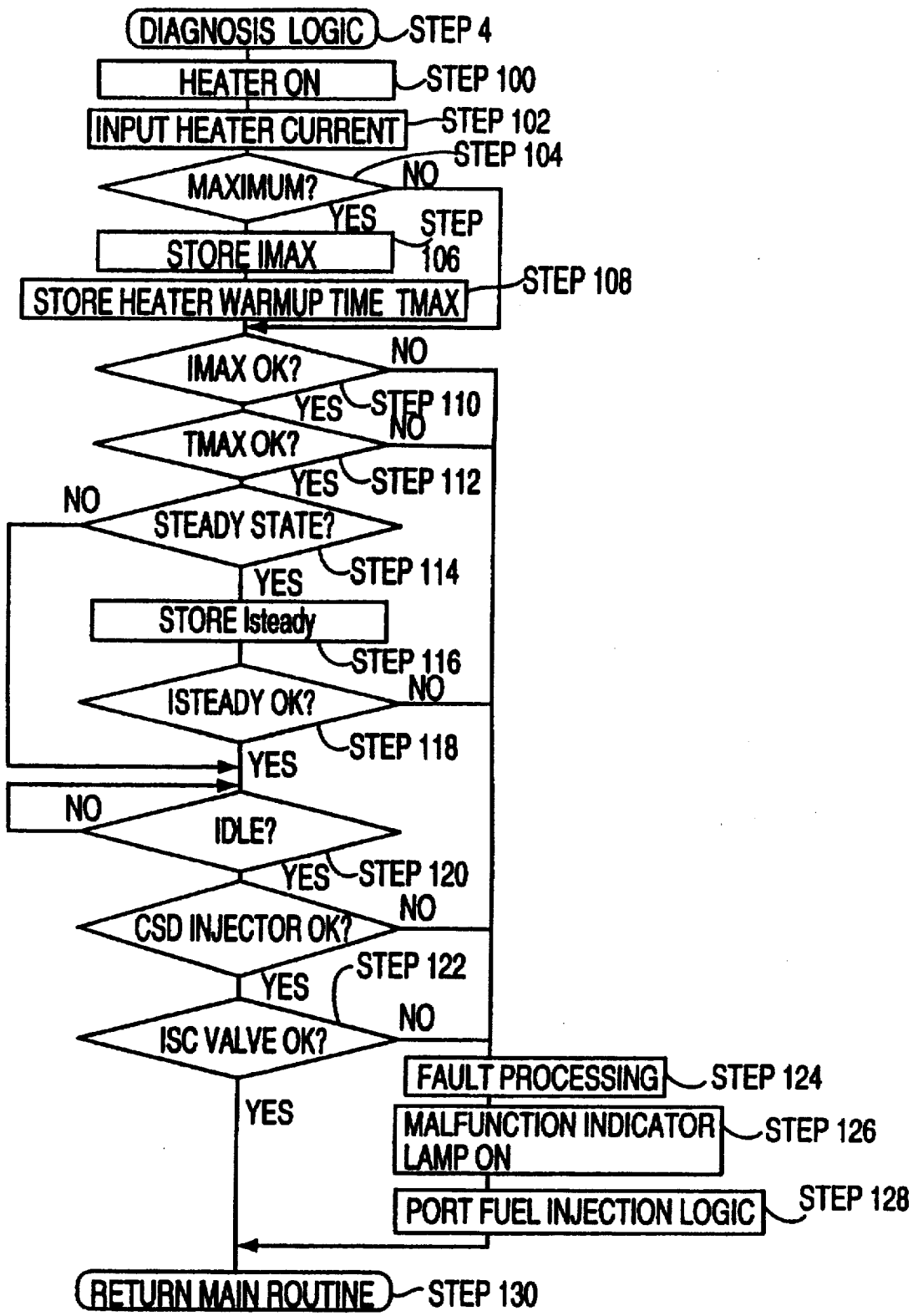
FIG. 15 is a flow diagram of the diagnostic operation of the cold start device, according to the present invention.

The diagnostic operation (step 4 of FIG. 8) will now be discussed in detail, with reference to FIGS. 15–17. Diagnostics in the heater element 1-f are based primarily on current and temperate measurements. In the diagnostic mode, the heater element 1-f is powered on (step 100) and the heater current is measured (step 102) using current meter 18.

Figure 17:
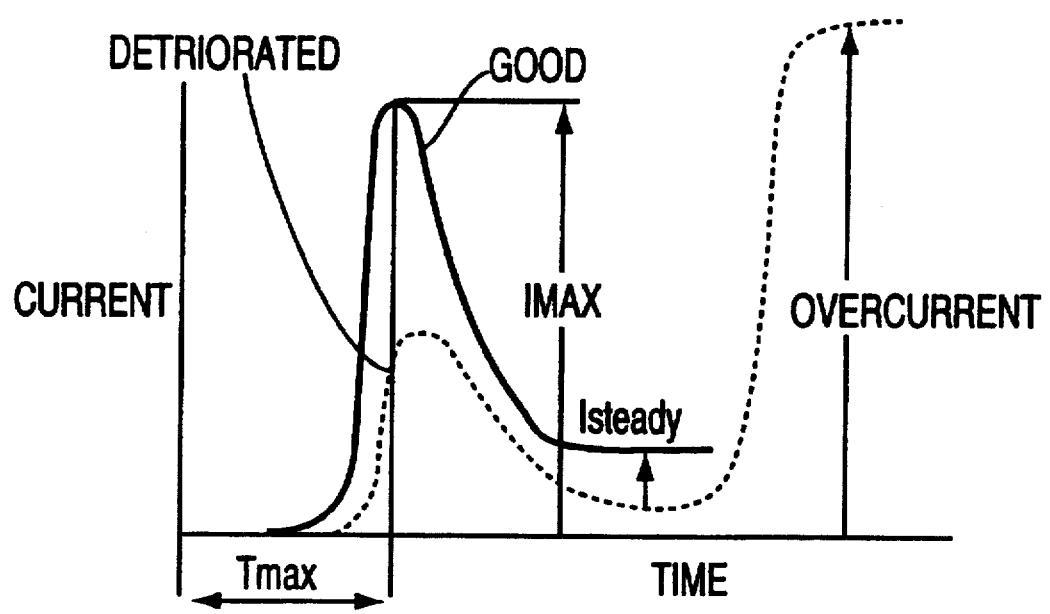

The heater current in a properly operating heating element 1-f will follow the path outlined by the solid line in the graph shown in FIG. 17. During an initial period $T_{max}$, the current will surge to a level $I_{max}$ so that the temperature of the heater element 1-f can quickly reach a steady state condition. After $I_{max}$ is reached, the current is reduced to a level represented by $I_{steady}$ in FIG. 17. FIG. 17 also indicates in the dotted line the graphical representation of the heater element 1-f in a deteriorated or dirty condition, and in an overcurrent condition when a fault exists.

Figure 16:
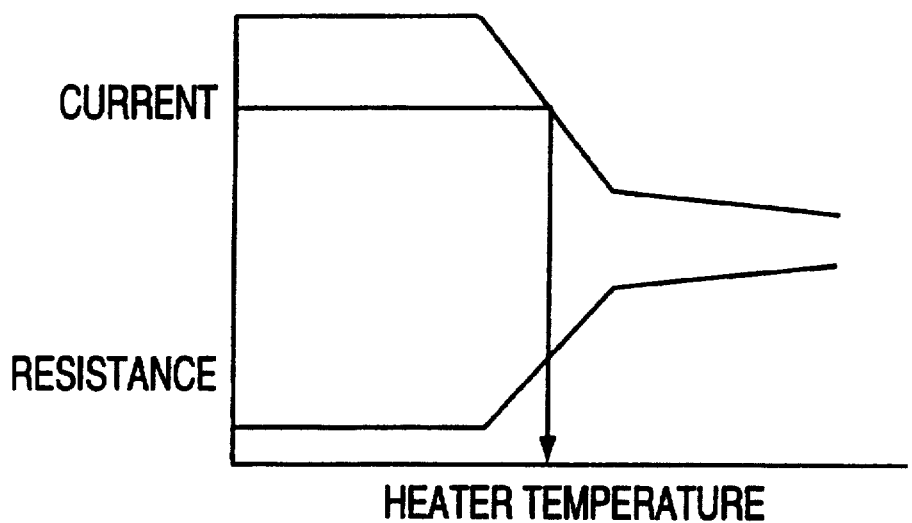
FIGS. 16 and 17 are graphical representations of the current levels through the fuel heater, according to the present invention.

FIG. 16 indicates the initial inverse relationship between the current level and the heater element 1-f temperature.

Initially, more current is needed to increase the temperature of the heater element 1-f. As the temperature begins to increase, the current can be decreased until both the current and temperature levels achieve a steady state balance.

Returning to FIG. 15, when the current peaks (step 104), the ECU 3 will store the measured current value (step 106) and the time it took to reach the peak current (step 108). These values are then compared to prestored threshold limits (steps 110–112) to detect a fault (step 124) if the measured current is too high or the heater element 1-f takes too long to heat up. Upon the detection of a fault, a malfunction indicator light is turned on step 126), and the cold start apparatus 1 is bypassed in favor of portion injection operation (step 128). This process protects the heater element 1-f from overheating or having a dangerous over current condition.

In a similar manner, the steady state current level is compared to a prestored threshold level to detect any fault conditions and avoid operation of the heater element 1-f during cold start idle, if the steady state current is out of bounds (steps 114–118). The measured steady state current value is compared to expected values based on several engine operating parameters, including fuel flow rate, ambient air temperature, mass air flow rate and engine vacuum.

Lastly, after the idle period during cold start, the ECU 3 checks that the cold start injector 1-d has ceased emitting fuel and that the idle speed control valve 1-b has closed. If these operations have proceeded properly, the ECU 3 returns to normal engine operation routines (step 130). Otherwise, a fault is indicated (steps 124–128).

Figure 18:
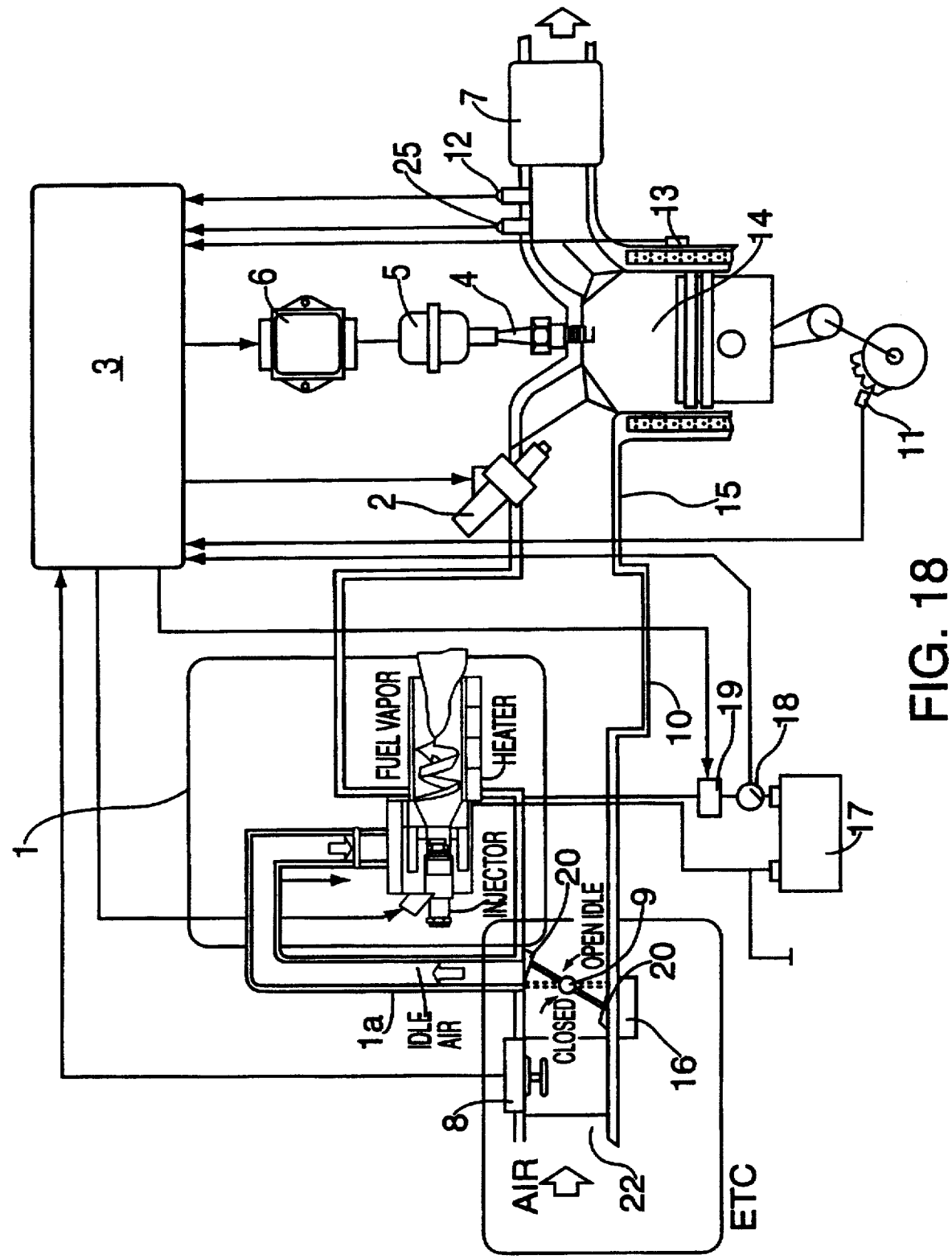
FIG. 18 is a perspective diagram of yet another embodiment of the present invention mounted on an internal combustion engine.

FIGS. 18–23 disclose another embodiment of the present invention that provides for more precise idle air flow control to the cold start apparatus 1. The embodiment in FIG. 18 is similar to the embodiment shown in FIG. 1. However, FIG. 18 further discloses a cold start apparatus 1 having an idle air inlet 1-a connected to the air passageway 22 adjacent to but downstream of the location of the throttle 9 when it is in a closed position (indicated by the vertical dotted line depiction of the throttle plate in FIGS. 18 and 19). In this embodiment, the throttle 9 is located within a tapered bore 20 that in part covers the opening of the idle air inlet 1-a. The tapered bore 20 is dimensioned to provide a seal about the throttle 9 for about 20% of its rotational travel. In this arrangement, air is blocked from traveling downstream of the throttle 9 until it has opened about 20%.

The area of the tapered bore 20 that covers the opening to the idle air inlet 1-a further contains an air flow hole or plurality of air flow holes 21 as shown in the views in FIGS. 20–23. The views in FIGS. 20–23 are a cross-sectional views of the tapered bore 20 looking into the idle air inlet 1-a, taken along the line A—A in FIG. 19.

As shown in FIGS. 20–23, the shape of each air flow hole 21 is designed to allow for increased air flow as the throttle 9 is opened. For example, as the throttle 9 rotates open, the exposed area of the air flow hole 21 is increased (from left to right in the diagrams) thereby allowing for increased air flow into idle air inlet 1-a. Different design shapes or numbers of air flow holes 21 allows for varying air flow control to the cold start apparatus 1. As can be appreciated, increased air flow controllability provides improved engine idle stability, especially in large bore throttle bodies and/or large displacement engines.

Advantageously, the tapered bore 20 of the present invention provides sufficient control of the air flow to the cold start apparatus 1 such that the need for another air flow control device (such as idle speed control valve 1-b) may be eliminated. In addition, by directing a larger amount of idle air to the cold start apparatus 1, cold start emissions can be reduced through improved vaporization even at high fuel flow rates. This can decrease catalytic converter light-off time and reduce emissions without sacrificing low speed idle stability.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A cold start apparatus for vaporizing fuel before it is supplied to a cylinder of a multi-cylinder internal combustion engine having a fuel supply, and an air intake passageway having a throttle valve comprising a pivotally secured throttle plate disposed therein, said cold start apparatus comprising:

a housing fluidly coupled on one end to the air intake passageway downstream of the location of the throttle;

a cold start fuel injector having an outlet and disposed in said housing;

an idle air conduit fluidly coupled on one end to the air intake passageway, and fluidly coupled on the other end to said housing for delivering air adjacent to the outlet of said cold start fuel injector for intermixing air with fuel ejected from said cold start fuel injector; and a heating chamber having a longitudinal lumen and disposed at the outlet of said cold start fuel injector for vaporizing the air-fuel mixture before it is delivered to the engine cylinder, wherein said heating chamber includes of a plurality of separately controlled independent heating element sections to vary the temperature across the heating chamber.

2. A cold start apparatus according to claim 1 further comprising an idle air control valve for controlling the amount of air delivered to said housing.

3. A cold start apparatus according to claim 1 wherein said idle air conduit is fluidly coupled to the air intake passageway upstream of the throttle valve.

4. A cold start apparatus according to claim 1 wherein the throttle plate is disposed in a tapered bore within the air intake passageway.

5. A cold start apparatus according to claim 4 wherein said tapered bore further comprises at least one aperture adjacent to and downstream of the throttle plate when the throttle plate is in a closed position, and said idle air conduit being fluidly coupled through said aperture to said air intake passageway as the throttle plate is rotated open passed said aperture.

6. A cold start apparatus according to claim 1 wherein said heating chamber further comprises a spiral depression within said lumen to effect the air-fuel mixture passing through the heating chamber to flow in a circuitously swirling fashion therethrough.

7. A cold start apparatus according to claim 1 wherein said heating chamber further comprises a heated surface configured in the shape of a corkscrew, and disposed within said lumen to cause fluid passing through said lumen to flow in a circuitously swirling fashion therethrough.

8. A cold start apparatus according to claim 1 wherein said heating chamber further comprises an inner surface made of a heat conductive material.

9. A cold start apparatus according to claim 1 further comprising an electronic control unit for controlling the operation of said cold start apparatus, said electronic control unit being responsive to at least the engine temperature and to the amount of current used by said heating chamber.

10. A cold start apparatus for vaporizing fuel before it is supplied to a cylinder of a multi-cylinder internal combustion engine having a fuel supply, and an air intake passageway having a throttle valve comprising a pivotally secured throttle plate disposed in a tapered bore within the air intake passageway, said cold start apparatus comprising:

a housing fluidly coupled on one end to the air intake passageway;

a cold start fuel injector having an outlet and disposed in said housing;

an idle air conduit fluidly coupled on one end to the air intake passageway, and fluidly coupled on the other end to said housing for delivering air adjacent to the outlet of said cold start fuel injector for intermixing air with fuel ejected from said cold start fuel injector; and a heating chamber having a longitudinal lumen and disposed at the outlet of said cold start fuel injector for vaporizing the air-fuel mixture before it is delivered to the engine cylinder, wherein said tapered bore in said air intake passageway further comprises a least one aperture adjacent to and downstream of the throttle plate when the throttle plate is in a closed position, and said idle air conduit being fluidly coupled through said aperture to said air intake passageway as the throttle plate is rotated open passed said aperture.

11. A cold start apparatus according to claim 10 wherein said heater chamber further comprises a spiral depression within said lumen to effect the air-fuel mixture passing through said heater chamber to flow in a circuitously swirling fashion therethrough.

12. A cold start apparatus according to claim 10 wherein said heater chamber further comprises a heated surface configured in the shape of a corkscrew, and disposed within said lumen to cause fluid passing through said lumen to flow in a circuitously swirling fashion therethrough.

13. A cold start apparatus according to claim 10 further comprising a n electronic control unit for controlling the operation of said cold start apparatus, said electronic control unit being responsive to at least the engine temperature and to the amount of current used by said heater chamber.

14. A method for reducing automobile exhaust emissions during the cold start of a multi-cylinder internal combustion engine having a fuel supply, a plurality of fuel injectors located adjacent to separate engine cylinders, a cold start fuel injector and heater, having a plurality of separately controlled independent heating element sections, fluidly coupled to the engine cylinders, and an air passageway having a pivotally secured throttle valve disposed therein, said method comprising the steps of:

initiating power to the heater for a period of time before the engine is started;

supplying fuel to the engine cylinders through the cold start injector;

mixing the fuel from the cold start injector with air to produce an air-fuel mixture;

passing said air-fuel over said heater elements to cause the fuel to be vaporized;

supplying the vaporized air-fuel mixture to the engine cylinders when the engine is started; and switching from fuel supplied by the cold start injector to fuel supplied by the plurality of fuel injectors after the engine reaches a pre-established threshold measured by temperature or time.

15. A method for reducing automobile exhaust emissions according to claim 14 further comprising the step of suspending power to the heater while the engine is being cranked during engine start up.

16. A method for reducing automobile exhaust emissions according to claim 14 further comprising the step of retarding the engine's spark until the engine temperature reaches about 60° C.

17. A method for reducing automobile exhaust emissions according to claim 14 further comprising the step of discontinuing power to the heater after switching from said cold start fuel injector to said plurality of fuel injectors.

18. A method for reducing automobile exhaust emissions according to claim 14, further comprising the step of cleaning deposits off the heater by momentarily spraying fuel on the heater from the cold start fuel injector.

19. A method for reducing automobile exhaust emissions according to claim 18 further comprising the step of simultaneously suspending the fuel supplied from the port fuel injectors by an amount substantially equal to the fuel supplied by the cold start fuel injector.

20. A method for reducing automobile exhaust emissions according to claim 14 wherein said step of switching from fuel supplied by the cold start injector to fuel supplied by each of the port injectors after the engine reaches a temperature of about 60° C.

21. A method for reducing automobile exhaust emissions according to claim 14 further comprising the steps of:

measuring the amount of current used by the heater after the heater has reached a steady state temperature;

comparing the measured steady state current level to a preset threshold current level; and triggering a malfunction indicator if the measured steady state current level is different from the threshold current level.

22. A method for reducing automobile exhaust emissions according to claim 14 further comprising the step of limiting the amount of air to be mixed with the fuel by controlling the rotational position of the throttle.

23. A method for reducing automobile exhaust emissions according to claim 14 wherein the heater contains a plurality of separate heater elements, said method further comprising the step of varying the power to the separate heater elements to effect different temperatures in the different heater elements.

24. A method for reducing automobile exhaust emissions according to claim 14 wherein the air-fuel mixture is passed over the heater in a circuitously swirling fashion with respect thereto.

25. A method for reducing automobile exhaust emissions during the cold start of a multi-cylinder internal combustion engine having a fuel supply, a plurality of fuel injectors located adjacent to separate engine cylinders, a cold start fuel injector and heater fluidly coupled to the engine cylinders, and an air passageway having a pivotally secured throttle valve disposed therein, said method comprising the steps of:

initiating power to the heater for a period of time before the engine is started;

supplying fuel through the cold start injector;

mixing the fuel from the cold start injector with air to produce an air-fuel mixture;

passing said air-fuel mixture over the heater to cause the fuel to be vaporized;

supplying the vaporized air-fuel mixture to the engine cylinders when the engine is started;

switching from fuel supplied by the cold start injector to fuel supplied by the plurality of fuel injectors after the engine reaches a pre-established threshold measured by temperature or time;

discontinuing power to the heater; and cleaning deposits off the heater by momentarily spraying fuel on the heater from the cold start fuel injector.

26. A method for reducing automobile exhaust emissions according to claim 25 further comprising the step of simultaneously suspending the fuel supplied from the port fuel injectors by an amount substantially equal to the fuel supplied by the cold start fuel injector during the step of cleaning deposits of the heater.

27. A method for reducing automobile exhaust emissions according to claim 25 further comprising the step of retarding the engine's spark until the engine temperature reaches about 60° C.

28. A method for reducing automobile exhaust emissions according to claim 25 further comprising the step of suspending power to the heater while the engine is being cranked during engine start up.

29. A method for reducing automobile exhaust emissions according to claim 25 wherein said step of switching from fuel supplied by the cold start injector to fuel supplied by each of the port injectors after the engine reaches a temperature of about 60° C.

30. A method for reducing automobile exhaust emissions according to claim 25 further comprising the step of limiting the amount of air to be mixed with the fuel by controlling the rotational position of the throttle.

31. A method for reducing automobile exhaust emissions during the cold start of a multi-cylinder internal combustion engine having a fuel supply, a plurality of fuel injectors located adjacent to separate engine cylinders, a cold start fuel injector and heater fluidly coupled to the engine cylinders, and an air passageway having a pivotally secured throttle valve disposed therein, said method comprising the steps of:

initiating power to the heater for a period of time before the engine is started;

supplying fuel through the cold start injector;

mixing the fuel from the cold start injector with air to produce an air-fuel mixture;

passing said air-fuel mixture over the heater to cause the fuel to be vaporized;

supplying the vaporized air-fuel mixture to the engine cylinders when the engine is started;

switching from fuel supplied by the cold start injector to fuel supplied by the plurality of fuel injectors after the engine reaches a pre-established threshold measured by temperature or time;

measuring the maximum amount of current used to initially power the heater;

comparing the measured maximum current to a preset threshold current level; and triggering a malfunction indicator if the measured maximum current is different from the threshold current level.

32. A method for reducing automobile exhaust emissions according to claim 31 further comprising the steps of:

measuring the amount of current used by the heater after the heater has reached a steady state temperature;

comparing the measured maximum current to a preset threshold current level; and triggering a malfunction indicator if the measured steady state current level is different from the threshold current level.

33. A method for reducing automobile exhaust emissions according to claim 31 further comprising the step of suspending power to the heater while the engine is being cranked during engine start up.

34. A method for reducing automobile exhaust emissions according to claim 31 wherein said step of switching from fuel supplied by the cold start injector to fuel supplied by each of the port injectors after the engine reaches a temperature of about 60° C.

35. A method for reducing automobile exhaust emissions according to claim 31 further comprising the step of limiting the amount of air to be mixed with the fuel by controlling the rotational position of the throttle.

36. A method for reducing automobile exhaust emissions according to claim 31 further comprising the steps of discontinuing power to the heater and cleaning deposits off the heater by momentarily spraying fuel on the heater from the cold start fuel injector.

* * * * *

UNITED STATES PATENT AND TRADEMARK OFFICE
CERTIFICATE OF CORRECTION

PATENT NO. : 5,894,832
DATED : April 20, 1999
INVENTOR(S) : Toshiharu Nogi et al.

It is certified that error appears in the above-identified patent and that said Letters Patent is hereby corrected as shown below:

Column 4, line 11 - Replace "is" with --are--.
Column 4, line 60 - Replace "passed" with --past--.
Column 6, line 13 - Replace "1" with --1-f--.
Column 6, line 33 - Insert -- of the -- after "one".
Column 8, line 8  - Replace "18" with --13--.
Column 8, line 10 - Replace "22" with --23--.
Column 8, line 16 - Replace "22" with --23--.
Column 10, line 27 - Replace "pulses" with --pulse--.
Column 12, line 13 - Replace "affected" with --effected--.
Column 12, line 56 - Replace "passed" with --past--.
Column 13, line 33 - Replace "passed" with --past--.
Column 13, line 36 - Replace "heater" with --heating--.
Column 13, line 38 - Replace "heater" with --heating--.
Column 13, line 41 - Replace "heater" with --heating--.
Column 13, line 46 - Replace "a n" with --an--.
Column 13, line 49 - Replace "heater" with --heating--.
Column 14, line 31 - Insert --occurs-- after "injectors".
Column 15, line 32 - Insert --occurs-- after "injectors".
Column 16, line 25 - Replace "maximum" with --steady state--.
Column 16, line 25 - Insert --level-- after "current".
Column 16, line 35 - Insert --occurs-- after "injectors".

Signed and Sealed this

Fourth Day of January, 2000

Attest:

Attesting Officer

Acting Commissioner of Patents and Trademarks